US012304801B1

(12) United States Patent
Vanden Berg

(10) Patent No.: US 12,304,801 B1
(45) Date of Patent: May 20, 2025

(54) GASOLINE DISPENSER VALVE SYSTEM

(71) Applicant: Lester James Vanden Berg, Comstock Park, MI (US)

(72) Inventor: Lester James Vanden Berg, Comstock Park, MI (US)

( * ) Notice: Subject to any disclaimer, the term of this patent is extended or adjusted under 35 U.S.C. 154(b) by 0 days.

(21) Appl. No.: 18/955,917

(22) Filed: Nov. 21, 2024

(51) Int. Cl.
*B67D 7/36* (2010.01)
*B67D 7/00* (2010.01)

(52) U.S. Cl.
CPC ............... *B67D 7/005* (2013.01); *B67D 7/36* (2013.01)

(58) Field of Classification Search
CPC .................................. B67D 7/005; B67D 7/36
See application file for complete search history.

(56) References Cited

U.S. PATENT DOCUMENTS 3,540,402 A * 11/1970 Kocher ............... H01M 50/609 141/308
5,076,333 A 12/1991 Law
6,435,380 B1 8/2002 Raboin
8,950,637 B2 2/2015 Wilkins
10,011,474 B2 7/2018 Bonner et al.
2014/0190988 A1* 7/2014 Hickey ................ B65D 47/305 222/484
2022/0281653 A1 9/2022 Maggiolo et al.

* cited by examiner

*Primary Examiner* — Paul J Gray
(74) *Attorney, Agent, or Firm* — Oppenhuizen Law PLC; David L. Oppenhuizen

(57) ABSTRACT

A spigot and valve system for a gasoline can includes a nozzle, an air return conduit within the nozzle, and a spigot housing containing a valve system. The valve system includes an air return shaft slidable within the spigot housing, a gas valve diaphragm secured to the air return shaft, a gas outlet spring, and an actuation lever. An inner air return shaft is positioned within and slidable with respect to the air return shaft. The system also includes a carriage slidably engaged with the inner air return shaft, an air return diaphragm attached to the carriage, and an air return spring between the air return shaft and carriage. The system operates in three positions to control gas flow and air return, ensuring safe and controlled dispensing of gasoline.

8 Claims, 10 Drawing Sheets

GASOLINE DISPENSER VALVE SYSTEM

BACKGROUND

1. Field of the Invention

The present disclosure relates to valve systems for portable gas cans, and more particularly to a spigot and valve system with an integrated air return mechanism for controlled dispensing of gasoline.

2. Description of the Prior Art

Portable gas cans are widely used for storing and transporting gasoline and other fuels for various applications, including refueling vehicles, lawn equipment, and other small engines. These containers typically feature a spout or nozzle for controlled dispensing of the fuel. While seemingly simple devices, gas cans and their associated dispensing systems face several challenges in terms of safety, ease of use, and environmental compliance.

One significant issue with conventional gas cans is the potential for pressure buildup within the container, particularly when exposed to high temperatures. As the fuel and air inside the can heat up and expand, internal pressure increases. This pressurization can lead to unexpected and potentially dangerous situations when the gas nozzle is opened, as the built-up pressure may cause liquid fuel or vapors to spray forcefully from the air return line. This not only poses safety risks but also results in fuel wastage and environmental concerns.

Additionally, many existing gas can designs struggle with providing smooth, controlled fuel flow during dispensing. Users often experience difficulties such as irregular flow, splashing, and overflow, which can lead to spills and potential safety hazards. The challenge lies in balancing the outflow of fuel with the inflow of replacement air to maintain consistent pressure within the can during pouring.

Furthermore, there is a growing need for gas can designs that comply with increasingly stringent environmental regulations while still maintaining user-friendly operation. This includes minimizing fuel vapor emissions during storage and use, as well as preventing accidental spills or overfilling of receiving tanks. Addressing these concerns while ensuring efficient and safe fuel dispensing remains a significant challenge in the field of portable fuel container design.

SUMMARY

According to an aspect of the present disclosure, a valve system for a portable gas can is provided. The valve system includes a spigot housing, a nozzle secured within the spigot housing, and an air return shaft slidably disposed within the spigot housing. The nozzle has a nozzle gas opening within the spigot housing. The valve system also includes a non-rigid air return conduit secured to an open end of the air return shaft, a gas valve diaphragm secured to the air return shaft, and a gas outlet spring positioned between the spigot housing and the gas valve diaphragm. The gas outlet spring biases the gas valve diaphragm against the nozzle gas opening. The valve system further includes an inner air return shaft positioned within and slidable with respect to the air return shaft, an air return diaphragm, and an air return spring. The inner air return shaft has a first end within the air return shaft and a second end extending beyond the air return shaft, with the second end being open and selectively open to an interior of the gas can. The air return spring is positioned to bias the air return shaft and the inner air return shaft away from one another.

According to other aspects of the present disclosure, the valve system may include one or more of the following features. The air return conduit may be formed from a flexible and resilient material suitable for exposure to gasoline. The flexible and resilient material may be selected from the group consisting of polyethylene, polypropylene, fluoropolymers, polyvinylidene fluoride, polyamide, and thermoplastic elastomers. The gas valve diaphragm may be in the form of a circular or rectangular disk made from rubber or an elastomer suitable for exposure to gasoline. The second end of the inner air return shaft may include a 180 degree bend or curve, providing a curved portion proximate to the open end. The valve system may include a carriage for the air return diaphragm, where the carriage is concentric with and slidingly engaged with respect to the inner air return shaft, and the air return diaphragm is attached to the carriage. The carriage may be slidable within the spigot housing and may include a carriage stop position. The air return spring may be positioned between the air return shaft and the carriage. The gas outlet spring may be weaker than the air return spring. The valve system may include an actuation lever secured to the air return shaft and extending out of the spigot housing. The air return conduit may be loosely coiled or spiral in shape. The nozzle may include a removable cap at its end.

According to another aspect of the present disclosure, a valve system for a portable gas can is provided. The valve system includes a spigot housing, a nozzle secured within the spigot housing, and an air return shaft slidably disposed within the spigot housing. The nozzle has a nozzle gas opening within the spigot housing. The valve system also includes a non-rigid air return conduit secured to an open end of the air return shaft, a gas valve diaphragm secured to the air return shaft, and a gas outlet spring positioned between the spigot housing and the gas valve diaphragm. The gas outlet spring biases the gas valve diaphragm against the nozzle gas opening. The air return shaft includes an extension section having a circular receptacle concentrically aligned with and distanced by a gap from the air return shaft. The valve system further includes an actuation lever sliding partially within the circular receptacle of the extension section and extending into the gap between the air return shaft and the circular receptacle. The actuation lever has an enlarged end section with a hollow center positioned around an end of the air return shaft, and the enlarged end section has a side wall opening. An air return spring surrounds the actuation lever and is positioned between the extension section of the air return shaft and the enlarged end section of the actuation lever.

According to other aspects of the present disclosure, the valve system may include one or more of the following features. The air return spring may bias a solid portion of the actuation lever against an end of the air return shaft. The valve system may be configured as a cartridge or insert installable into the gas can. The actuation lever may be part of a trigger system accessible on a rear outside portion of the gas can.

For a more complete understanding, reference is made to the following detailed description and accompanying drawings. In the drawings, like reference characters refer to like parts throughout the views in which:

DETAILED DESCRIPTION

Figure 1:
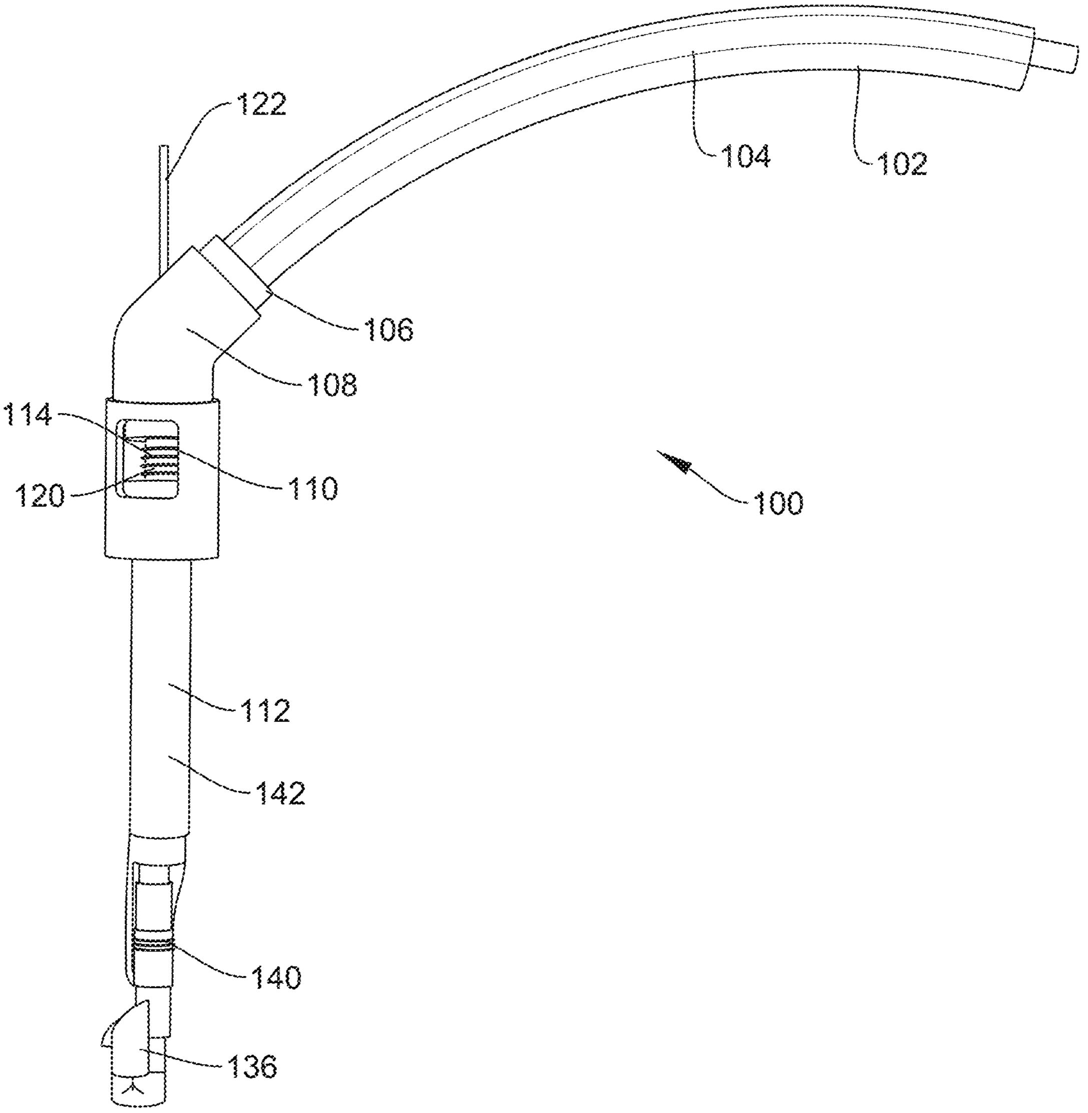
FIG. 1 illustrates a perspective view of a spigot and valve system for use with a gasoline can, in accordance with an embodiment of the disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to valve systems for portable gas cans, and more particularly to spigot and valve systems with integrated air return mechanisms for controlled dispensing of gasoline. In some aspects, a spigot and valve system for a portable gas can may include a nozzle with a gas opening, a spigot housing connected to the nozzle, and an air return shaft slidably disposed within the spigot housing. The system may further comprise a gas valve diaphragm secured to the air return shaft and positioned to selectively seal the gas opening, as well as a gas outlet spring biasing the gas valve diaphragm towards a closed position.

In certain implementations, the system may include an inner air return shaft slidably disposed within the air return shaft, an air return diaphragm positioned to selectively seal an open end of the inner air return shaft, and an air return spring biasing the inner air return shaft towards a closed position. The gas outlet spring may be configured to compress before the air return spring when an actuation force is applied to the air return shaft.

Some variations of the spigot and valve system may incorporate a flexible air return conduit extending from the inner air return shaft to a distal end of the nozzle. This flexible air return conduit may be formed from materials such as polyethylene, polypropylene, fluoropolymers, polyvinylidene fluoride, polyamide, or thermoplastic elastomers.

In certain aspects, the system may include an actuation lever connected to the air return shaft and extending through the spigot housing. The actuation lever may be configured to slide the air return shaft when depressed, allowing for user control of the valve system.

Some implementations may feature a carriage slidably engaged with the inner air return shaft, with the air return diaphragm secured to the carriage. The carriage may include a carriage stop position that limits forward movement of the carriage, and the air return spring may be positioned between the air return shaft and the carriage.

Alternative configurations of the spigot and valve system may incorporate an extension section connected to the air return shaft, with a circular receptacle at an end of the extension section. An actuation lever may extend from the air return shaft and slide partially within the circular receptacle. In such configurations, an air return spring may be positioned between the circular receptacle and an enlarged end section of the actuation lever.

Based upon the foregoing disclosure, it is seen that the present disclosure provides a spigot and valve system for portable gas cans that addresses issues of pressure buildup and controlled fuel dispensing. The system may allow for depressurization of the gas can contents before opening the air return pathway, potentially reducing the risk of unexpected fuel or vapor expulsion. The integrated air return mechanism may facilitate smooth fuel flow by balancing outflow with air intake. Additionally, the system's design may offer improved safety features and user control during the dispensing process.

Referring to FIG. 1, a spigot and valve system 100 for use with a gasoline can may be seen. The system 100 may comprise a curved nozzle 102 connected to a spigot housing 108. In some aspects, the nozzle 102 may have an elongated curved shape, with a larger diameter portion near the spigot housing 108 that tapers to a smaller diameter at the dispensing end. The inner diameter of the nozzle 102 may be about 1.5 centimeters in some implementations.

Within the curved nozzle 102, a flexible air return conduit 104 may be visible, extending from the spigot housing 108 to near the dispensing end of the nozzle 102. The air return conduit 104 may be formed from flexible and resilient materials suitable for exposure to chemicals like gasoline. In some cases, these materials may include polyethylene, polypropylene, fluoropolymers, polyvinylidene fluoride, nylon, or thermoplastic elastomers. The inner diameter of the air return conduit 104 may be about 0.5 centimeters in certain implementations. In some aspects, the air return conduit 104 may be loosely coiled or spiral in shape within the nozzle 102.

The spigot housing 108 may be a cylindrical component positioned at the base of the nozzle 102. It may contain the valve system 112 for controlling gasoline flow and air return. In some implementations, a valve shaft 142 may extend downward from the spigot housing 108, housing part of the valve system 112.

Protruding from the top of the spigot housing 108, an actuation lever 122 may be present for operating the valve system 112 and controlling the flow of gasoline and return air. The actuation lever 122 may be connected to an air return shaft 114 within the spigot housing 108.

In some aspects, the end of the nozzle 102 may include a removable cap. This feature may provide additional protection and prevent spillage when the spigot and valve system 100 is not in use.

The design of the spigot and valve system 100 may integrate the gasoline flow path and air return system into a single curved spout structure. This configuration may allow for controlled dispensing of gasoline while facilitating air return to the container. The flexible air return conduit 104 within the nozzle 102 may enable the curved design while maintaining functionality, potentially reducing spillage and improving flow control.

Figure 2:
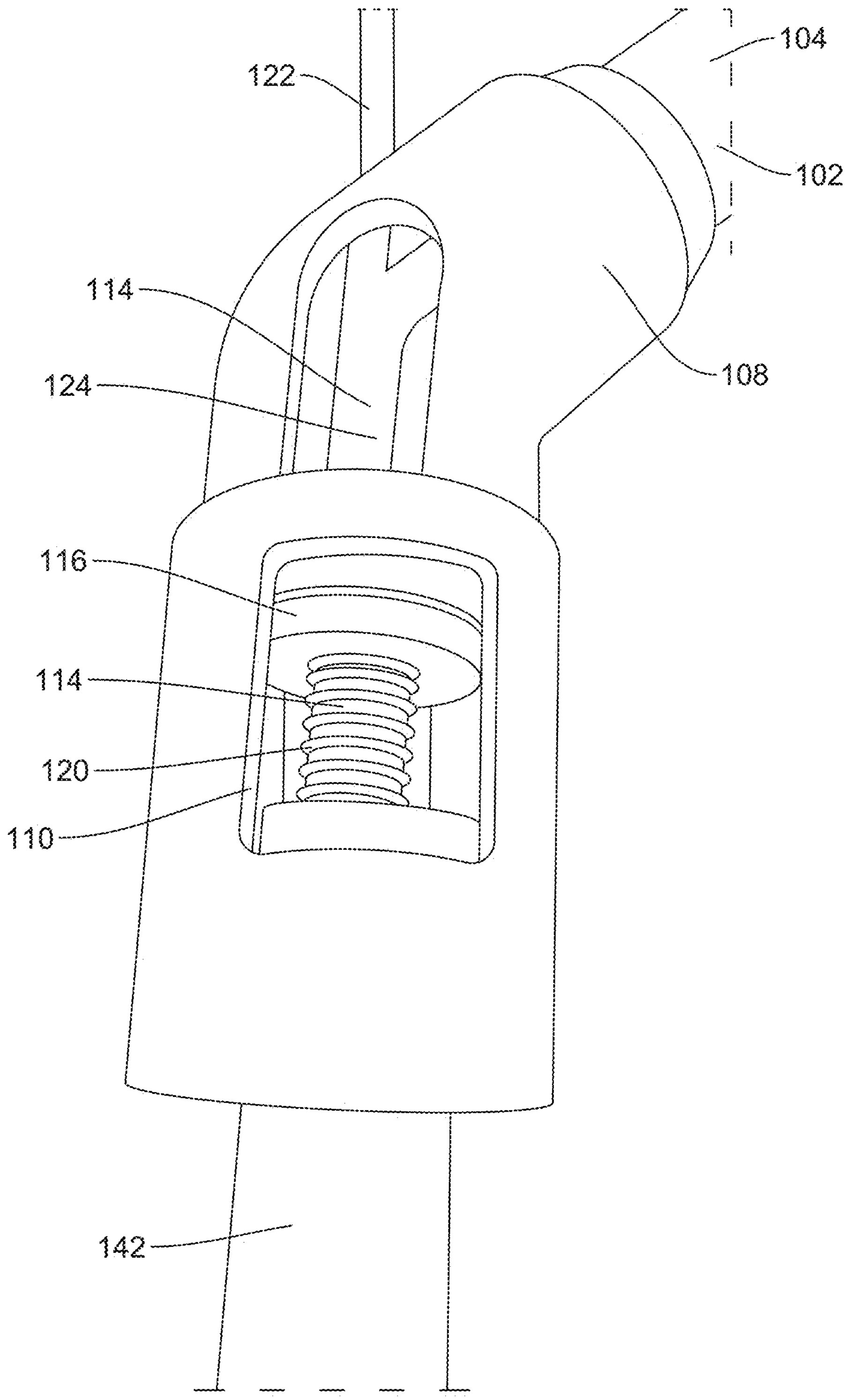
FIG. 2 illustrates an enlarged partial view of the spigot and valve system in a closed position, in accordance with an embodiment of the disclosure.
Figure 3:
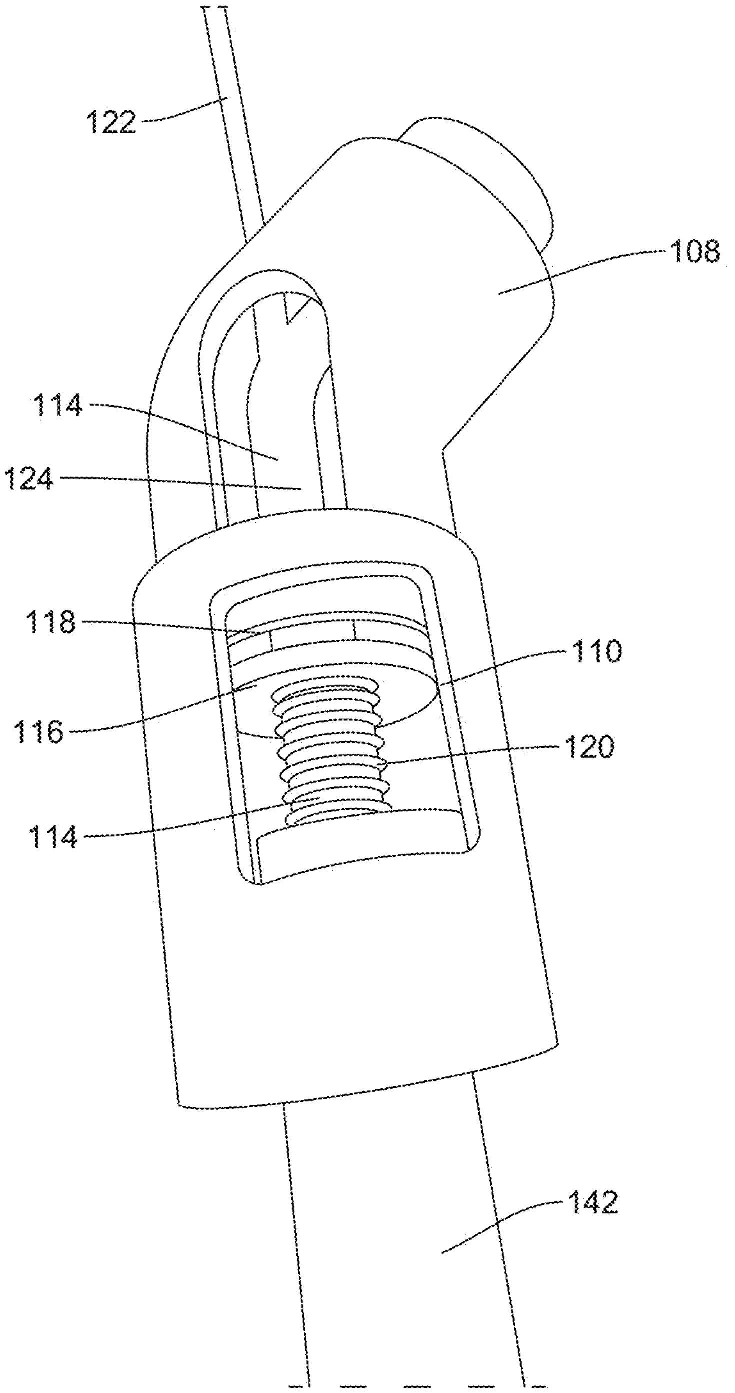
FIG. 3 illustrates an enlarged partial view of the spigot and valve system in an open position, in accordance with an embodiment of the disclosure.

FIGS. 2 and 3 illustrate enlarged partial views of the spigot and valve system 100 in closed and open positions, respectively. The images show the internal components of the valve system 112 and a section of the nozzle 102 with the air return conduit 104 extending outward from the spigot housing 108.

The nozzle 102 has a curved design. The upper portion of the spigot housing 108 contains a hollow channel, visible through a cutout, which reveals the first end 124 of the air return shaft 114. In some implementations, the air return shaft 114 may be positioned within the spigot housing 108. The air return shaft 114 may be configured to slide back and forth within the spigot housing 108. This sliding motion may allow for controlled actuation of the valve system and regulation of gasoline flow and air return.

Below the curved section of the spigot housing 108, the spigot housing 108 includes a nozzle gas opening 110 which is the entry point for gasoline into the nozzle 102. Visible through the nozzle gas opening 110 are the air return shaft 114, the gas outlet spring 120 which is coiled around the air return shaft 114 in a helical manner, and the gas valve diaphragm 116 which is secured to the air return shaft 114.

In FIG. 2, the gas outlet spring 120 provides resistance or return force to bias the gas valve diaphragm 116 in a closed position. In FIG. 3, the gas outlet spring 120 is shown in a semi-compressed state to place the gas valve diaphragm 116 in an open position, allowing gasoline to flow through the nozzle opening 118.

The design integrates the valve system 112 directly into the spigot housing 108, allowing for control of gasoline flow. The curved nozzle 102 design and integrated valve system 112 suggest a compact and efficient layout for the gasoline dispenser.

An actuation lever 122, shown as a thin metal rod or tube, is visible extending upwards from the air return shaft 114 and extends through a hole in the spigot housing 108. The actuation lever 122 may be used to control the position of the gas valve diaphragm 116, thereby regulating the flow of gasoline through the system.

The cutaway views in FIGS. 2 and 3 provide insight into the internal workings of the gasoline dispenser, showcasing the integration of the valve mechanism within the spout structure and its operation in both closed and open positions.

Figure 4:
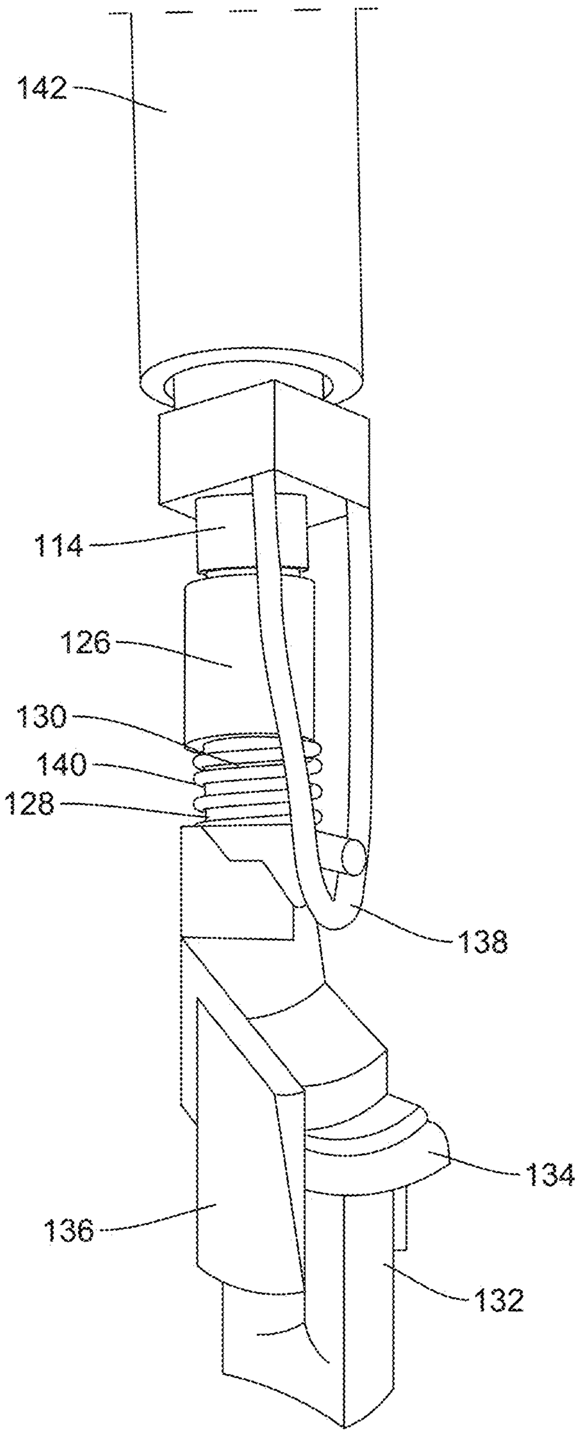
FIG. 4 illustrates an enlarged partial view of an air return mechanism in a first position, in accordance with an embodiment of the disclosure.
Figure 5:
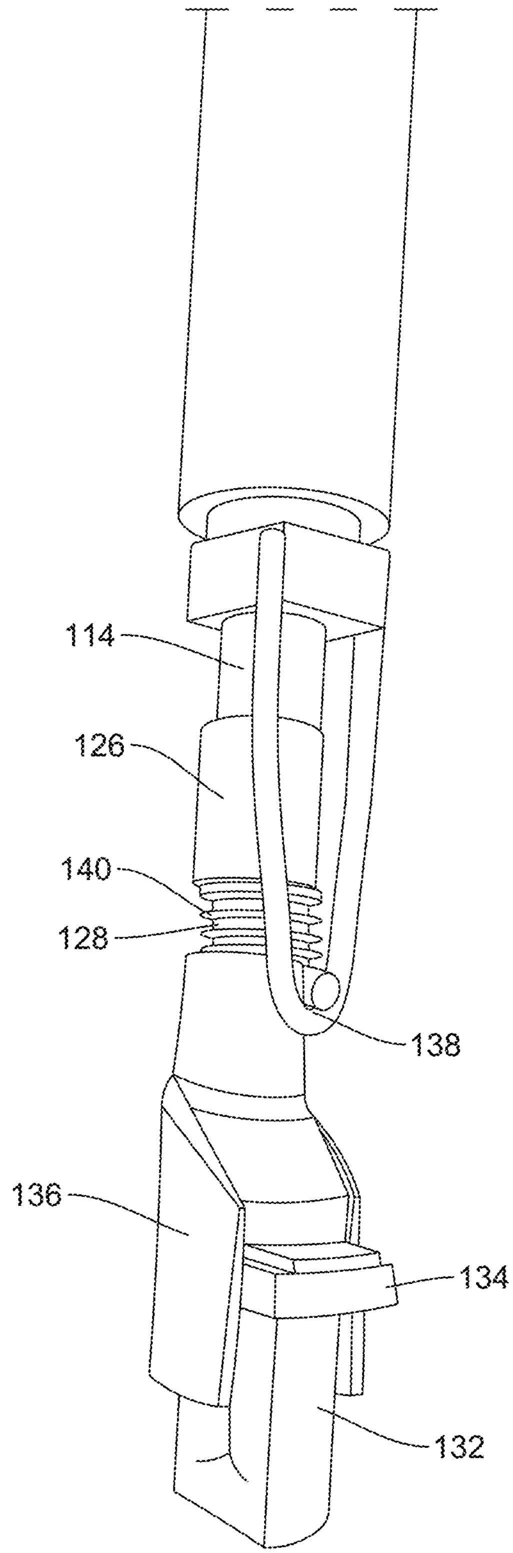
FIG. 5 illustrates an enlarged partial view of the air return mechanism in a second position, in accordance with an embodiment of the disclosure.
Figure 6:
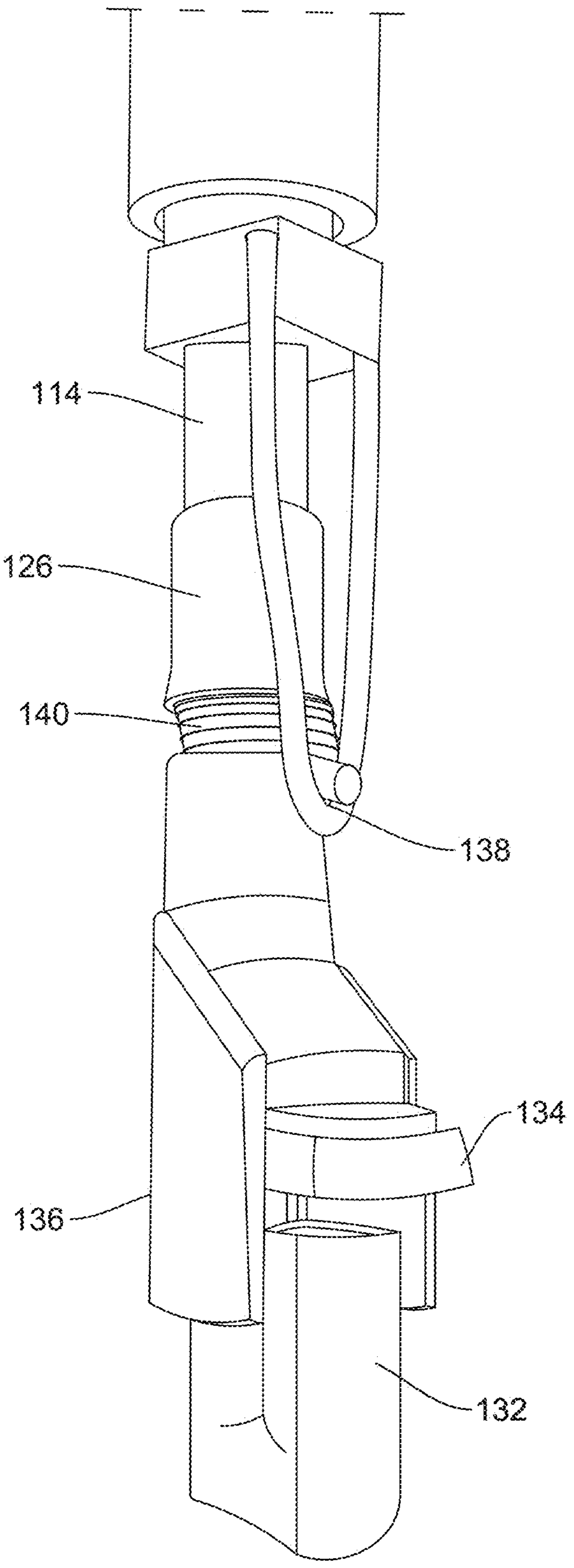
FIG. 6 illustrates an enlarged partial view of the air return mechanism in a third position, in accordance with an embodiment of the disclosure.

FIGS. 4, 5, and 6 illustrate enlarged partial views of the air return mechanism for the spigot and valve system 100, focusing on the internal components of the air return shaft 114 and its associated parts. These figures depict the positions of the components in three different states: the first position where the actuation lever is not depressed (FIG. 4), the second position where the actuation lever is partially depressed such that the gas nozzle is opened but the air return remains closed (FIG. 5), and the third position where the air return shaft is fully translated or extended (FIG. 6).

The air return shaft 114 is shown as a cylindrical component with a hollow interior. At the second end of the air return shaft 126, an inner air return shaft 128 is visible. This inner air return shaft 128 has a first end 130 positioned within the air return shaft 114 and a second end 132 that extends beyond the air return shaft 114.

At the second end 132 of the inner air return shaft 128, an air return diaphragm 134 is positioned. The air return diaphragm 134 is a flat, circular or rectangular component that seals against the end of the inner air return shaft 128, and may be formed from any suitable type of gasoline-resistant elastomeric material that is well known in the art.

A carriage 136 is visible, which is a structural component that supports and guides the movement of the air return diaphragm 134. The carriage 136 has a defined carriage stop position 138, which limits its range of motion.

Between the air return shaft 114 and the carriage 136, an air return spring 140 is installed. This spring is coiled around the inner air return shaft 128 and provides resistance or return force to the system.

As the mechanism moves from the first position (FIG. 4) to the second position (FIG. 5) and finally to the third position (FIG. 6), the relative positions of these components change. In the first position, all components are at rest. In the second position, the air return shaft 114 has moved, but the air return diaphragm 134 remains sealed. In the third position, the air return shaft 114 is fully extended, and the air return diaphragm 134 has moved away from its sealed position.

The components are arranged in a linear fashion, providing a controlled movement and sealing of the air return system. This design controls the regulation of air flow within the spigot and valve system, contributing to the overall functionality of the gasoline dispenser by allowing for precise control over both fuel dispensing and air return.

Figure 7:
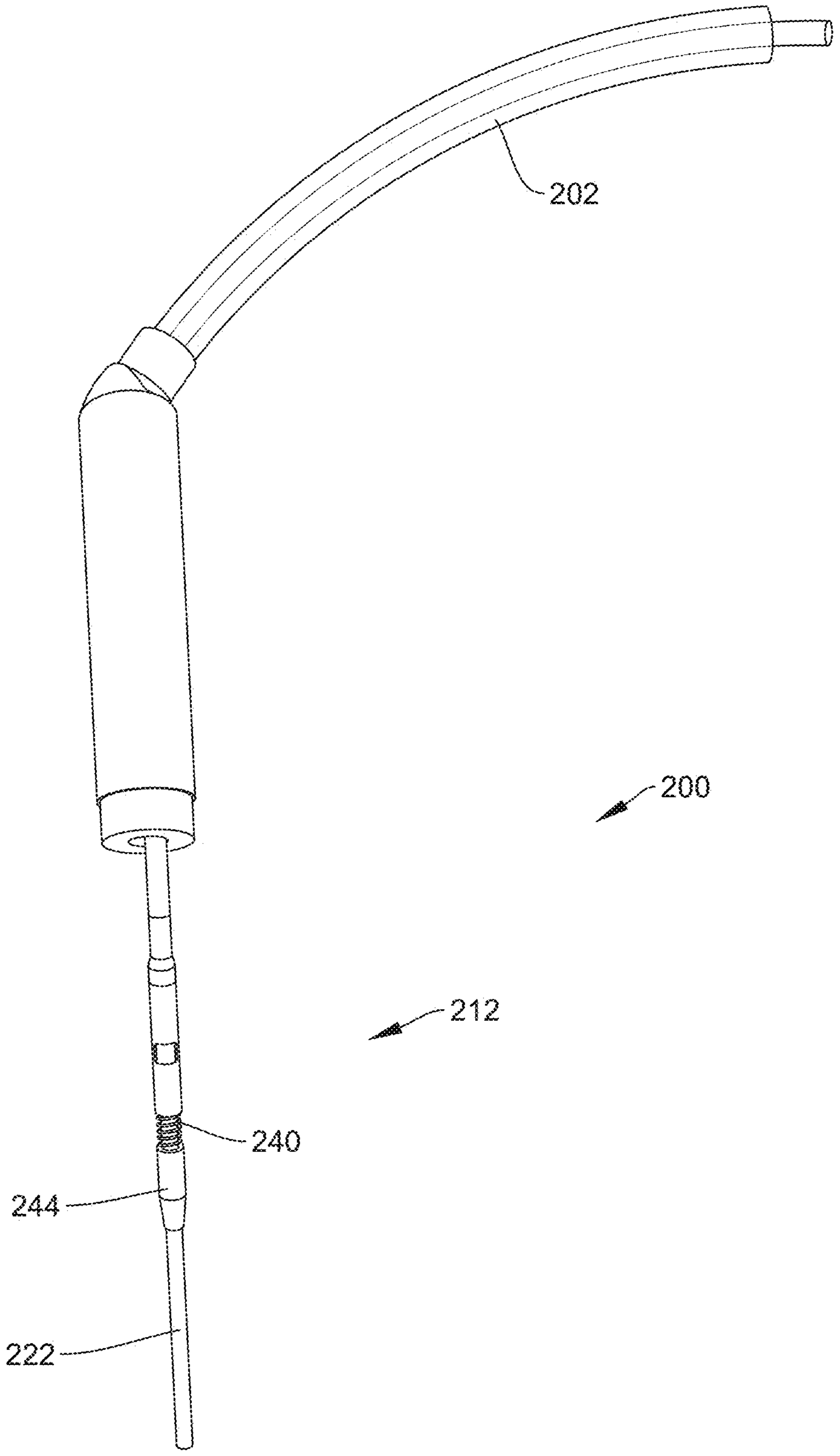
FIG. 7 illustrates a perspective view of a second embodiment of a spigot and valve system, in accordance with an embodiment of the disclosure.

Referring to FIG. 7, a second embodiment of a spigot and valve system 200 for dispensing gasoline is illustrated. The system 200 may comprise a curved nozzle 202 connected to a cylindrical valve housing. In some aspects, the nozzle 202 may have an elongated curved shape, with a larger diameter portion near the valve housing that tapers to a smaller diameter at the dispensing end.

The valve system 212 may be contained within the cylindrical housing at the base of the nozzle 202. In certain implementations, the valve system 212 may be designed as a complete cartridge or insert that can be inserted into and installed into a gas can. This modular design may allow for easier maintenance or replacement of the valve system 212.

Inside the valve housing, an air return spring 240 is shown. This spring may be coiled around a central shaft and may provide resistance or return force to the system. The spring mechanism allows for controlled movement within the valve system 212.

A circular receptacle 244 may be visible at the junction between the nozzle 202 and the valve housing. This receptacle may serve as a connection point or seal between the two components in some implementations.

The design of the spigot and valve system 200 may integrate the gasoline flow path and air return system into a single curved spout structure. This configuration may allow for controlled dispensing of gasoline while facilitating air return to the container. The curved nozzle 202 design and integrated valve system 212 may suggest a compact and efficient layout for the gasoline dispenser.

In some aspects, the modular design of the valve system 212 as a cartridge or insert may offer advantages in terms of manufacturing, assembly, and maintenance. This approach may allow for easier replacement of the entire valve mechanism if needed, potentially extending the lifespan of the gas can itself.

Figure 8:
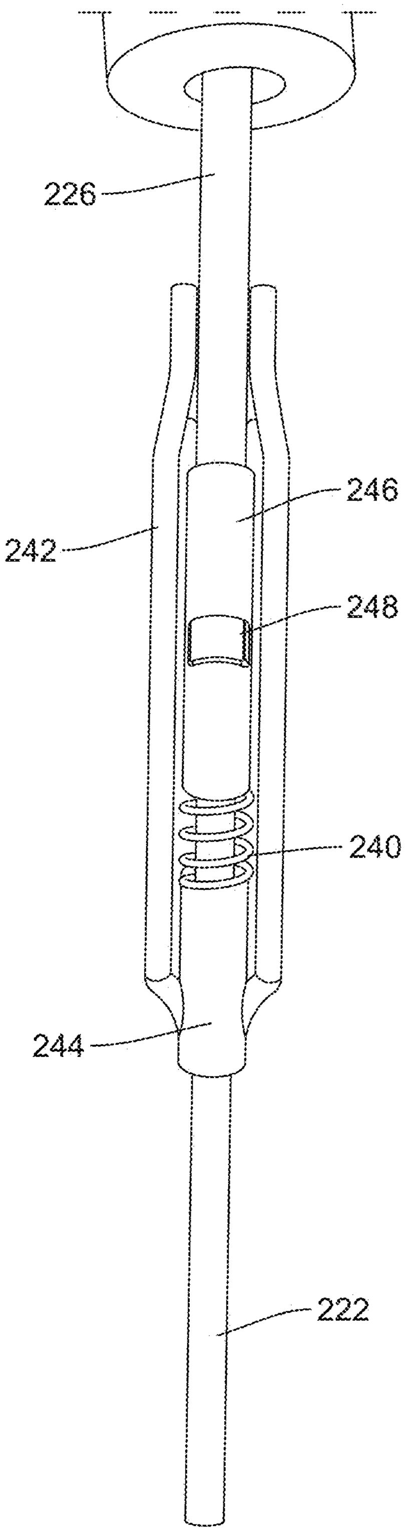
FIG. 8 illustrates an enlarged partial view of the second embodiment of the spigot and valve system, in accordance with an embodiment of the disclosure.

Referring to FIG. 8, an enlarged partial view of a portion of the spigot and valve system 200 according to the second embodiment is illustrated, focusing on the internal components of the valve mechanism. The image provides a detailed look at the structure and arrangement of various elements within the air return portion of the system.

As shown, a second end of the air return shaft 226 extends downwardly from the spigot housing. Extending downwardly from the second end of the air return shaft 226, an extension section 242 may form a main body of the valve mechanism. In some aspects, the extension section 242 may terminate at a circular receptacle 244.

At the bottom, an actuation lever 222 is shown. The lever 222 extends downward from the valve mechanism and serves as the control point for operating the valve system. In some implementations, the actuation lever 222 may extend through, and be slidable within, the circular receptacle 244. The actuation lever 222 may be configured to be pulled to slide within the circular receptacle 244. This sliding motion may allow for precise control over the valve system operation. As the actuation lever 222 is pulled, it may move relative to the circular receptacle 244, potentially enabling a user to modulate the flow of gasoline and air through the system. The pulling action may provide a natural and intuitive method for users to operate the valve mechanism, which may enhance ease of use and control during the dispensing process.

At an upper end of the actuation lever 222, an enlarged end section 246 may be present. This enlarged end section 246 may be hollow and may partially surround, receive, and be slidable with respect to a lower end of the second end of the air return shaft 226.

The enlarged end section 246 may feature a side wall opening 248, which may be visible as a cutout in the side of the cylindrical structure. In some cases, when exposed, the opening 248 may allow air within the second end of the air return shaft 226 to flow out of the air return shaft, through the side wall opening 248, and into the gas tank.

Within the extension section 242, an air return spring 240 may be visible. This spring may be coiled around a central shaft of the actuation lever 222, potentially providing resistance or return force to the system. In some implementations, the air return spring 240 may be positioned between the enlarged end section 246 and the circular receptacle 244.

Extending below the enlarged end section 246, the second end of the air return shaft 226 may be present. This shaft may appear as a solid rod or tube that runs through the center of the mechanism.

Figure 9:
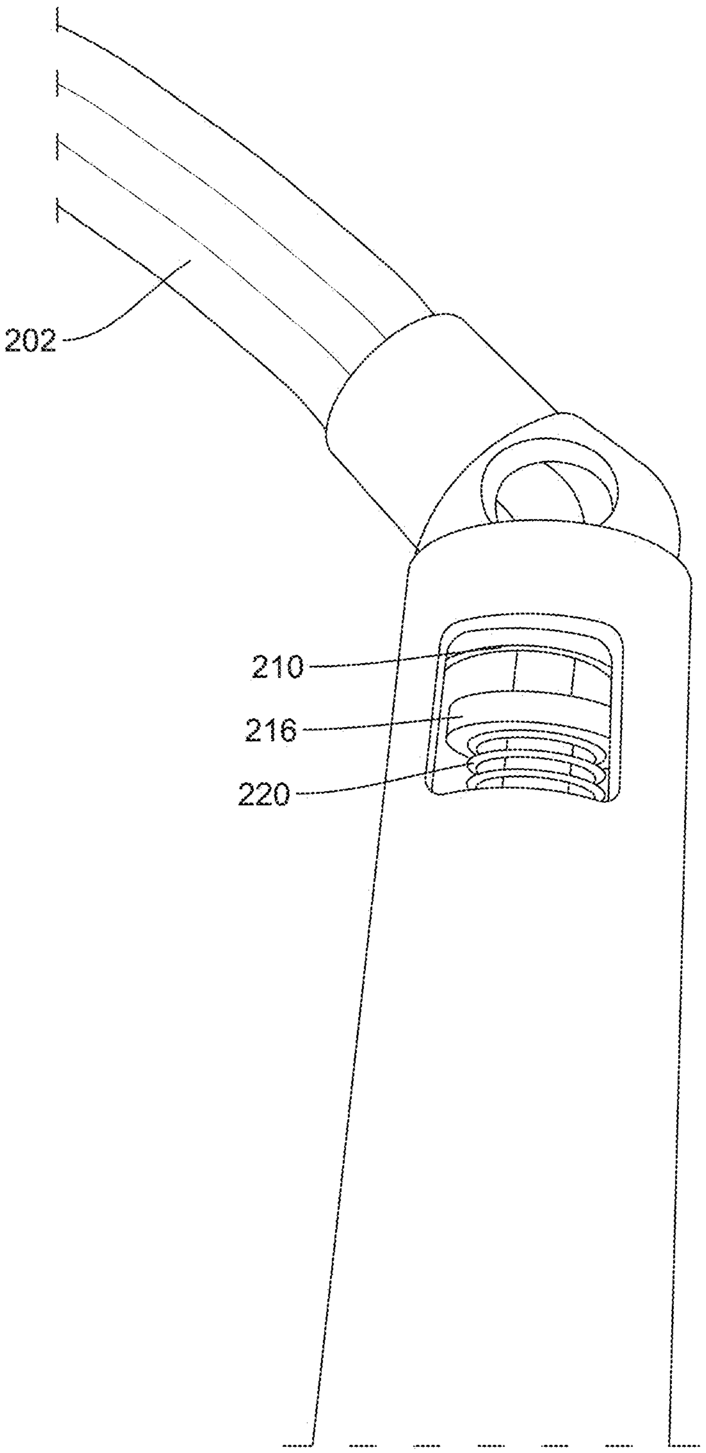
FIG. 9 illustrates an enlarged partial view of a nozzle and spigot housing of the second embodiment, in accordance with an embodiment of the disclosure.

Referring to FIG. 9, an enlarged partial view of a portion of a nozzle 202 and a spigot housing according to the second embodiment is illustrated, focusing on the internal valve mechanism. The nozzle 202 as shown may have a curved, tubular structure.

A nozzle gas opening 210 may be present, which may serve as the passage for gasoline flow from the exterior of the nozzle to the interior. In some aspects, the size and shape of the nozzle gas opening 210 may be designed to optimize fuel flow while maintaining control over the dispensing process.

Within the nozzle gas opening 210, a gas valve diaphragm 216 may be visible. The gas valve diaphragm 216 may appear as a circular component positioned to seal the nozzle gas opening 210 when in a closed position. As shown in the drawing, the gas valve diaphragm 216 may be in an open position to permit gas to flow through the nozzle gas opening 210. In some implementations, the gas valve diaphragm 216 may be formed from a durable, fuel-resistant material to ensure long-term functionality and reliability.

Below the gas valve diaphragm 216, a gas outlet spring 220 may be seen. The gas outlet spring 220 may be a coiled spring that provides the necessary force to keep the gas valve diaphragm 216 in position against the nozzle gas opening 210. In some cases, the gas outlet spring 220 may be designed to provide sufficient tension to maintain a seal when the valve is closed, while allowing for smooth opening when actuated.

The arrangement of these components may demonstrate the mechanism for controlling gasoline flow through the nozzle 202. When the valve is actuated, the gas valve diaphragm 216 may move against the force of the gas outlet spring 220, allowing gasoline to flow through the nozzle gas opening 210 and out of the nozzle 202. In some aspects, the movement of the gas valve diaphragm 216 may be precisely controlled to allow for variable flow rates, potentially enhancing user control over the dispensing process.

In certain implementations, the materials used for the gas valve diaphragm 216 and the gas outlet spring 220 may be selected for their resistance to degradation from prolonged exposure to gasoline and other fuels. This selection may contribute to the longevity and reliability of the valve system.

The configuration shown in FIG. 9 may allow for efficient and controlled dispensing of gasoline. The open position of the gas valve diaphragm 216 may illustrate how the system facilitates fuel flow when actuated, while the presence of the gas outlet spring 220 may suggest how the system maintains a closed position when not in use, potentially preventing unwanted leakage or spillage.

Figure 10:
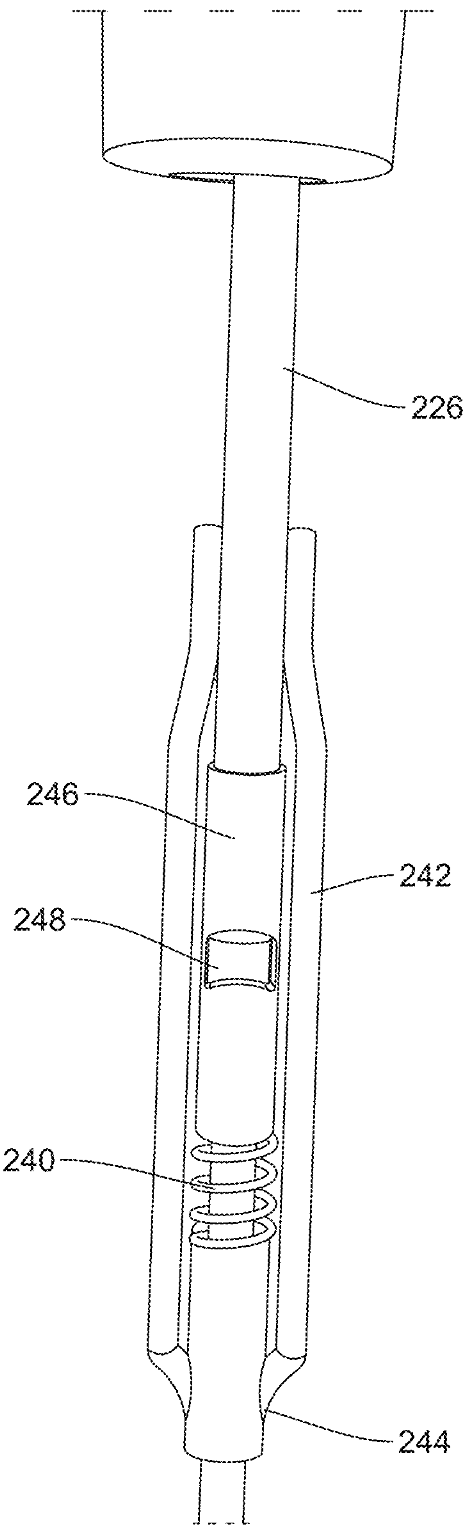
FIG. 10 illustrates an enlarged partial view of a valve mechanism of the second embodiment, in accordance with an embodiment of the disclosure.

Referring to FIG. 10, an enlarged partial view of a portion of the valve mechanism for a gasoline dispenser according to the second embodiment is illustrated. The image focuses on the internal components of the air return system.

At the top of the image, the second end of the air return shaft 226 may extend downward. Below this, an extension section 242 may form the main body of the valve mechanism. The extension section 242 may terminate at a circular receptacle 244.

An actuation lever 222 may extend through and be slidable within the circular receptacle 244. At the upper end of the actuation lever 222, an enlarged end section 246 may be present. This enlarged end section 246 may be hollow and may partially surround, receive, and be slidable with respect to the lower end of the second end of the air return shaft 226.

The enlarged end section 246 may feature a side wall opening 248, visible as a cutout in the side of the cylindrical structure. In some implementations, when exposed, the opening 248 may allow air within the second end of the air return shaft 226 to flow out of the air return shaft, through the side wall opening 248, and into the gas tank.

Within the extension section 242, an air return spring 240 may be visible. This spring may be coiled around the central shaft of the actuation lever 222, positioned between the enlarged end section 246 and the circular receptacle 244. The air return spring 240 may provide resistance or return force to the system.

The arrangement of these components may demonstrate the mechanism for controlling air flow within the valve system. When actuated, the movement of these parts may allow for the regulated flow of air through the system. In some aspects, the sliding motion of the actuation lever 222 within the circular receptacle 244 may compress the air return spring 240, potentially creating a controlled opening for air return.

The design of this valve mechanism may facilitate precise control over both fuel dispensing and air return. In certain implementations, the materials used for the components may be selected for their durability and resistance to degradation from prolonged exposure to gasoline and other fuels, potentially contributing to the longevity and reliability of the valve system.

In some implementations, the valve mechanisms may operate in a sequential manner to control the flow of gasoline and air within the system. The gas outlet spring 220 may be designed to have a lower spring constant compared to the air return spring 240. This configuration may allow the gas outlet spring 220 to compress first when the actuation lever 222 is pulled.

As the actuation lever 222 is initially actuated, the gas outlet spring 220 may compress, causing the gas valve diaphragm 216 to move away from the nozzle gas opening 210. This movement may create an opening that allows any compressed or pressurized air inside the gas can to escape. The release of this pressurized air may help prevent sudden, uncontrolled discharge of gasoline when the nozzle is first opened.

With further actuation of the lever 222, the air return spring 240 may begin to compress. This compression may cause the enlarged end section 246 to move relative to the second end of the air return shaft 226, exposing the side wall opening 248. The exposure of this opening may allow air to flow into the gas can, relieving any vacuum that may have formed within the container. This air return mechanism may facilitate the smooth and continuous flow of gasoline out of the can by equalizing the pressure inside and outside the container.

In some aspects, the sequential operation of first opening the gas valve and then the air return valve may provide several advantages. It may allow for controlled depressurization of the gas can, reduce the risk of gasoline splashing or spraying unexpectedly, and ensure a steady flow of fuel during dispensing. The system may also prevent the formation of a vacuum inside the can, which could otherwise impede the flow of gasoline.

The design of the valve mechanisms may allow for precise control over the dispensing process. Users may be able to modulate the flow rate by adjusting the degree of actuation of the lever 222. Partial actuation may open only the gas valve, while full actuation may engage both the gas valve and air return systems, potentially allowing for different flow rates or dispensing modes.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A spigot and valve system for a portable gas can, comprising:
- a nozzle having a gas opening;
- a spigot housing connected to the nozzle;
- an air return shaft slidably disposed within the spigot housing;
- a gas valve diaphragm secured to the air return shaft and positioned to selectively seal the gas opening;
- a gas outlet spring biasing the gas valve diaphragm towards a closed position;
- an actuation lever extending from the air return shaft;
- an extension section connected to the air return shaft;
- a circular receptacle at an end of the extension section; and
- an air return spring positioned between the circular receptacle and an enlarged end section of the actuation lever,
- wherein the actuation lever is configured to be pulled to slide within the circular receptacle to selectively open the gas valve diaphragm and allow air flow through a side wall opening in the enlarged end section, and wherein pulling the actuation lever compresses the gas outlet spring before compressing the air return spring.

2. The spigot and valve system of claim 1, wherein compressing the gas outlet spring opens the gas valve diaphragm to allow gas flow through the gas opening.

3. The spigot and valve system of claim 1, wherein further pulling of the actuation lever compresses the air return spring to allow air flow through the side wall opening.

4. The spigot and valve system of claim 1, wherein the enlarged end section of the actuation lever partially surrounds and is slidable with respect to a lower end of the air return shaft.

5. The spigot and valve system of claim 4, wherein the side wall opening is a cutout in the enlarged end section.

6. The spigot and valve system of claim 1, further comprising a flexible air return conduit extending from the air return shaft to a distal end of the nozzle.

7. The spigot and valve system of claim 6, wherein the flexible air return conduit is formed from a material selected from the group consisting of polyethylene, polypropylene, fluoropolymers, polyvinylidene fluoride, polyamide, and thermoplastic elastomers.

8. The spigot and valve system of claim 1, wherein the nozzle is curved.

* * * * *